United States Patent
Stevens et al.

(10) Patent No.: US 9,726,044 B2
(45) Date of Patent: Aug. 8, 2017

(54) CONSUMABLE ASSEMBLY MISTAKE PROOFING TOOL FOR A GAS TURBINE ENGINE

(71) Applicant: United Technologies Corporation, Hartford, CT (US)

(72) Inventors: Michael S. Stevens, Alfred, ME (US); Timothy M. Davis, Kennebunk, ME (US)

(73) Assignee: United Technologies Corporation, Farmington, CT (US)

( * ) Notice: Subject to any disclaimer, the term of this patent is extended or adjusted under 35 U.S.C. 154(b) by 556 days.

(21) Appl. No.: 14/179,122

(22) Filed: Feb. 12, 2014

(65) Prior Publication Data

US 2014/0223920 A1    Aug. 14, 2014

Related U.S. Application Data

(60) Provisional application No. 61/763,692, filed on Feb. 12, 2013.

(51) Int. Cl.
  *F01D 25/28*    (2006.01)
  *F01D 25/24*    (2006.01)

(52) U.S. Cl.
  CPC .......... *F01D 25/246* (2013.01); *F01D 25/285* (2013.01); *F05D 2240/11* (2013.01); *F05D 2300/43* (2013.01); *Y02T 50/671* (2013.01); *Y10T 29/49229* (2015.01)

(58) Field of Classification Search
  CPC ............. F05D 2230/60; F05D 2230/64; F05D 2230/642; F05D 2230/644; F05D 2230/52; F05D 2240/14; F05D 2240/90; F05D 2240/91; F05D 2240/30; F05D 2300/43; F05D 2240/11; B23P 15/008; F01D 11/12; F01D 25/285; F01D 25/243; F01D 25/246; F01D 25/28
  See application file for complete search history.

(56) References Cited

U.S. PATENT DOCUMENTS

| | | | |
|---|---|---|---|
| 3,768,147 A | 10/1973 | Berry et al. | |
| 4,096,615 A | 6/1978 | Cross | |
| 4,529,452 A | 7/1985 | Walker | |
| 4,736,504 A | 4/1988 | Jones | |
| 4,864,706 A | 9/1989 | Jenkel | |
| 4,874,031 A | 10/1989 | Janney | |
| 5,031,288 A | 7/1991 | Sadler | |
| 5,390,413 A | 2/1995 | Pratt | |
| 5,551,623 A | 9/1996 | Collot et al. | |
| 5,813,593 A | 9/1998 | Galaske, Jr. | |
| 7,438,520 B2 * | 10/2008 | Ruthemeyer | F01D 11/08 415/135 |
| 2009/0140569 A1 * | 6/2009 | Mashimo | B60N 2/5825 297/452.59 |
| 2010/0236332 A1 * | 9/2010 | Vontell | F01D 25/285 73/756 |
| 2014/0154062 A1 * | 6/2014 | Weber | F01D 11/00 415/174.4 |

* cited by examiner

*Primary Examiner* — Christopher Besler
(74) *Attorney, Agent, or Firm* — O'Shea Getz P.C.

(57) ABSTRACT

A method of assembling a gas turbine engine includes locating a consumable assembly tool clip within the engine.

18 Claims, 5 Drawing Sheets

CONSUMABLE ASSEMBLY MISTAKE PROOFING TOOL FOR A GAS TURBINE ENGINE

This application claims priority to U.S. patent application No. 61/763,692 filed Feb. 12, 2013.

BACKGROUND

The present disclosure relates to a gas turbine engine and, more particularly, to tooling therefor.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

Some engine architectures may include components that are installed in particular circumferential locations to ensure proper interfaces such as engagement of anti-rotation lugs into a mating component with slots that transfers rotational loads to an outer case. Typically, proper alignment is assured through part geometry that is physically impossible to install out of position. This may result in extraneous material in the component to only provide this function. This material may also limit possibilities for stress reduction.

SUMMARY

A method of assembling a gas turbine engine according to one disclosed non-limiting embodiment of the present disclosure includes locating a consumable assembly tool clip within the engine.

A further embodiment of the present disclosure includes running the engine to vaporize the consumable assembly tool clip.

A further embodiment of any of the foregoing embodiments of the present disclosure includes gluing the consumable assembly tool clip within the engine.

A further embodiment of any of the foregoing embodiments of the present disclosure includes gluing the consumable assembly tool clip within the engine as a multiple of segments.

A further embodiment of any of the foregoing embodiments of the present disclosure includes gluing the consumable assembly tool clip within the engine as a full hoop.

A further embodiment of any of the foregoing embodiments of the present disclosure includes gluing the consumable assembly tool clip to a component prior to assembly of the component into the engine.

A further embodiment of any of the foregoing embodiments of the present disclosure includes gluing the consumable assembly tool clip to a multiple of components prior to assembly of the multiple of components into the engine.

A further embodiment of any of the foregoing embodiments of the present disclosure includes locating the consumable assembly tool clip adjacent to a Blade Outer Air Seal (BOAS) assembly to operate as a stop.

A further embodiment of any of the foregoing embodiments of the present disclosure includes locating the consumable assembly tool clip adjacent to a flexible component.

A further embodiment of any of the foregoing embodiments of the present disclosure includes locating the consumable assembly tool clip within an axially movable assembly of the engine.

An assembly for a gas turbine engine according to one disclosed non-limiting embodiment of the present disclosure includes a component; and a consumable assembly tool clip attached to the component.

A further embodiment of any of the foregoing embodiments of the present disclosure includes wherein the consumable assembly tool clip is manufactured of a Polymer.

A further embodiment of any of the foregoing embodiments of the present disclosure includes wherein the consumable assembly tool clip is manufactured of a polyethylene.

A further embodiment of any of the foregoing embodiments of the present disclosure includes wherein the consumable assembly tool clip is glued to the component.

A further embodiment of any of the foregoing embodiments of the present disclosure includes wherein the consumable assembly tool clip includes a full hoop ring.

A further embodiment of any of the foregoing embodiments of the present disclosure includes wherein the consumable assembly tool clip includes a multiple of segments.

A further embodiment of any of the foregoing embodiments of the present disclosure includes wherein the consumable assembly tool clip is clipped to the component.

A further embodiment of any of the foregoing embodiments of the present disclosure includes wherein the consumable assembly tool clip is clipped to the component with an interference fit.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
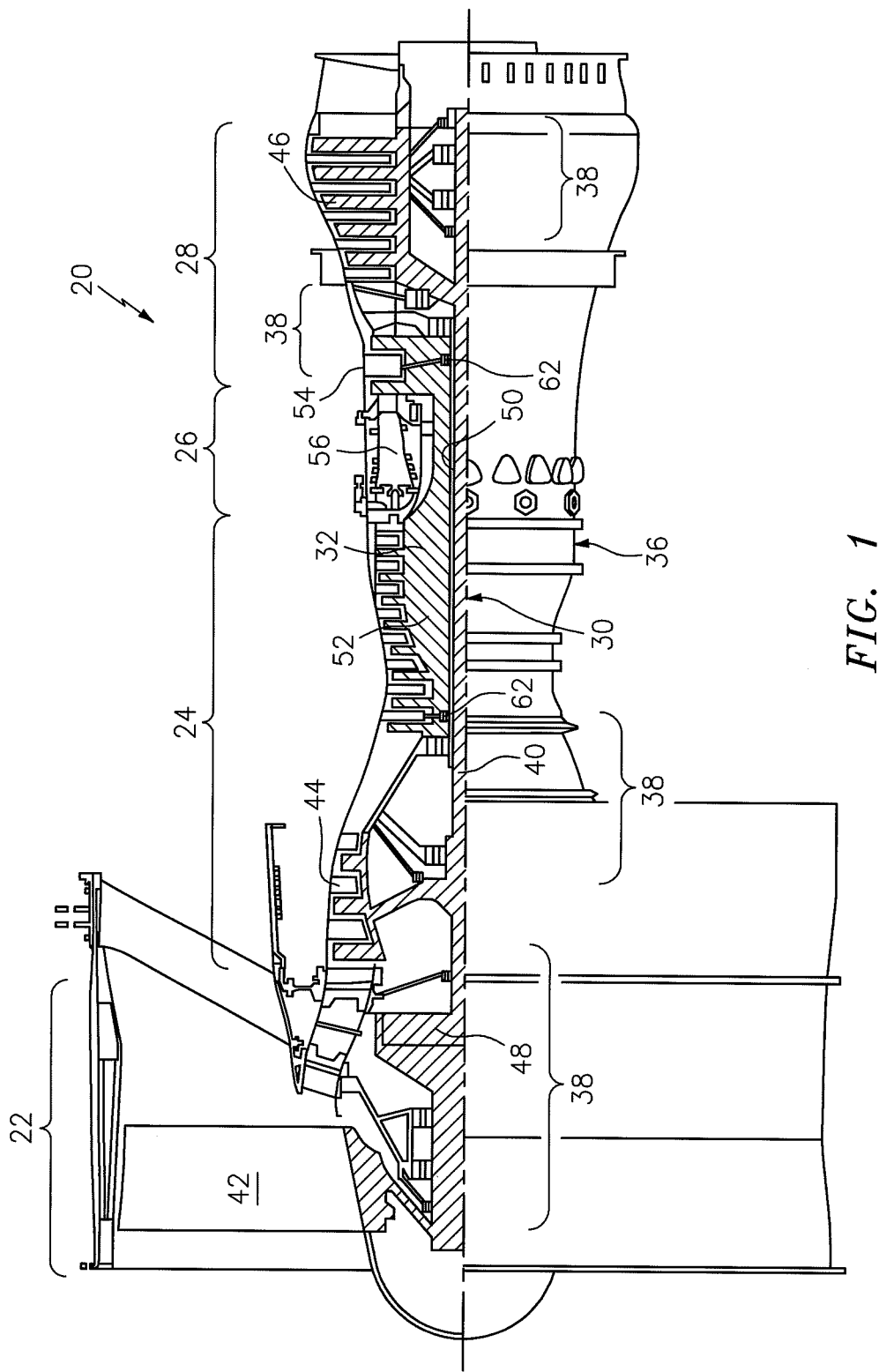
FIG. 1 is a schematic cross-section of an example gas turbine engine architecture.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engine architectures might include an augmentor section and exhaust duct section (not shown) among other systems or features. The fan section 22 drives air along a bypass flowpath while the compressor section 24 drives air along a core flowpath for compression and communication into the combustor section 26 then expansion thru the turbine section 28. Although depicted as a turbofan in the disclosed non-limiting embodiment, it should be understood that the concepts described herein are not limited to use with turbofans as the teachings may be applied to other types of turbine engines such as a low bypass augmented turbofan, turbojets, turboshafts, and three-spool (plus fan) turbofans wherein an intermediate spool includes an intermediate pressure compressor ("IPC") between a Low Pressure Compressor ("LPC") and a High Pressure Compressor ("HPC"), and an intermediate pressure turbine ("IPT") between the high pressure turbine ("HPT") and the Low pressure Turbine ("LPT").

The engine 20 generally includes a low spool 30 and a high spool 32 mounted for rotation about an engine central longitudinal axis A relative to an engine case structure 36 via several bearing compartments 38. The low spool 30 generally includes an inner shaft 40 that interconnects a fan 42, a low pressure compressor 44 ("LPC") and a low pressure turbine 46 ("LPT"). The inner shaft 40 drives the fan 42 directly or thru a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor 52 ("HPC") and high pressure turbine 54 ("HPT"). A combustor 56 is arranged between the HPC 52 and the HPT 54. The inner shaft 40 and the outer shaft 50 are concentric and rotate about the engine central longitudinal axis A which is collinear with their longitudinal axes.

Core airflow is compressed by the LPC 44 then the HPC 52, mixed with fuel and burned in the combustor 56, then expanded over the HPT 54 and the LPT 46. The turbines 54, 46 rotationally drive the respective low spool 30 and high spool 32 in response to the expansion. The main engine shafts 40, 50 are supported at a plurality of points by the bearing compartments 38. It should be understood that various bearing compartments 38 at various locations may alternatively or additionally be provided.

In one example, the gas turbine engine 20 is a high-bypass geared aircraft engine with a bypass ratio greater than about six (6:1). The geared architecture 48 can include an epicyclic gear train, such as a planetary gear system or other gear system. The example epicyclic gear train has a gear reduction ratio of greater than about 2.3:1, and in another example is greater than about 2.5:1. The geared turbofan enables operation of the low spool 30 at higher speeds which can increase the operational efficiency of the LPC 44 and LPT 46 to render increased pressure in a relatively few number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting embodiment, the bypass ratio of the gas turbine engine 20 is greater than about ten (10:1), the fan diameter is significantly larger than that of the LPC 44, and the LPT 46 has a pressure ratio that is greater than about five (5:1). It should be understood, however, that the above parameters are only exemplary of one embodiment of a geared architecture engine and that the present disclosure is applicable to other gas turbine engines including direct drive turbofans, where the rotational speed of the fan 42 is the same (1:1) of the LPC 44.

In one example, a significant amount of thrust is provided by the bypass flow path due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The relatively low Fan Pressure Ratio according to one example gas turbine engine 20 is less than 1.45. Low Corrected Fan Tip Speed is the actual fan tip speed divided by an industry standard temperature correction of ("T"/518.7)$^{0.5}$ in which "T" represents the ambient temperature in degrees Rankine. The Low Corrected Fan Tip Speed according to one example gas turbine engine 20 is less than about 1150 fps (351 m/s).

Figure 2:
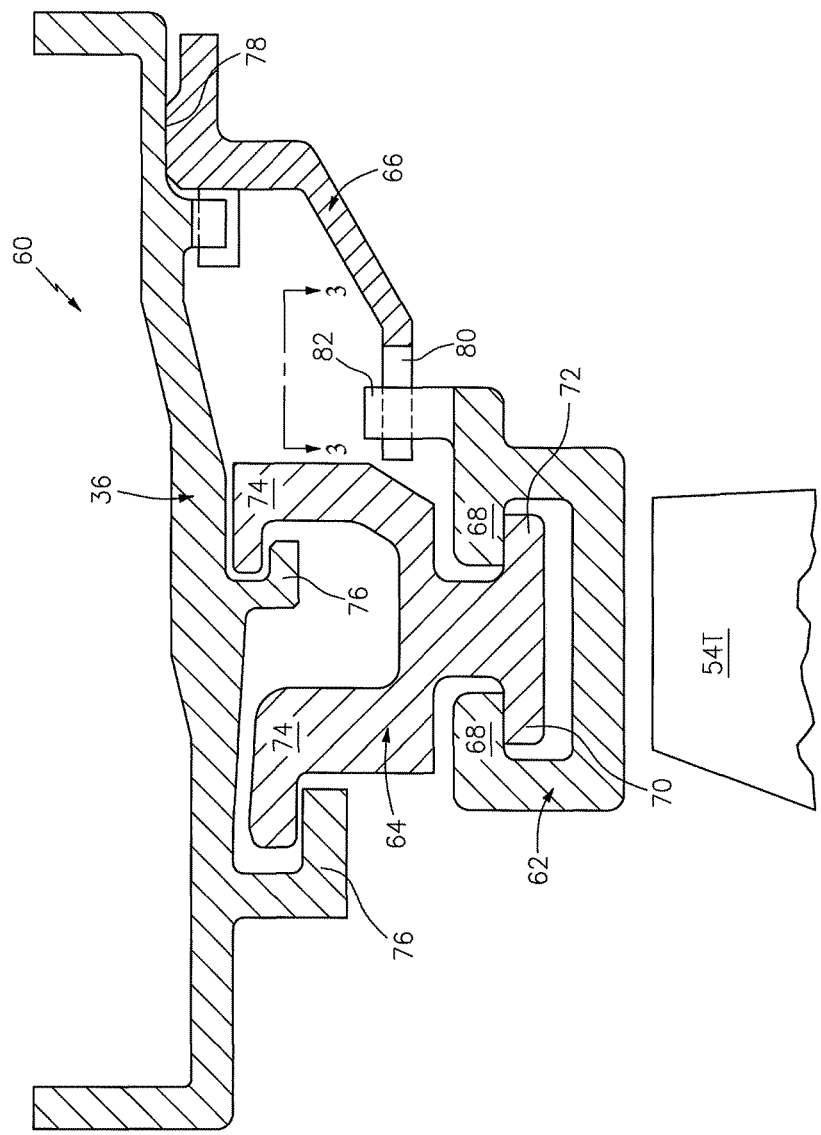
FIG. 2 is a partial expanded cross-section view of a circumferentially aligned assembly of a gas turbine engine.

With reference to FIG. 2, the engine 20 includes a circumferentially aligned assembly 60 disposed in an annulus radially between the engine case structure 36 and airfoil tips 54T of, for example, the HPT 54. The circumferentially aligned assembly 60 generally includes a multiple of segmented components 62, a support 64 and a full hoop component 66. The multiple of segmented components 62 such as Blade Outer Air seals (BOAS) include flanges 68 that interface with an upstream extended portion 70 and an opposed downstream extended portion 72 of the support 64. The support 64 includes interfaces 74 that engage with segmented hooks 76 that extend from the engine case structure 36. The full hoop component 66 defines an interference fit 78 with the engine case structure 36 and includes slots 80 which receive lugs 82 that extend from each of the multiple of segmented components 62.

During operation the multiple of segmented components 62 apply a load circumferentially into the full hoop component 66 at each lug 82/slot 80 interface. This load is then transferred through the full hoop component 66 into the engine case structure 36. The full hoop component 66 rotationally locks to anti-rotate the multiple of segmented components 62 and the support 64.

Figure 3:
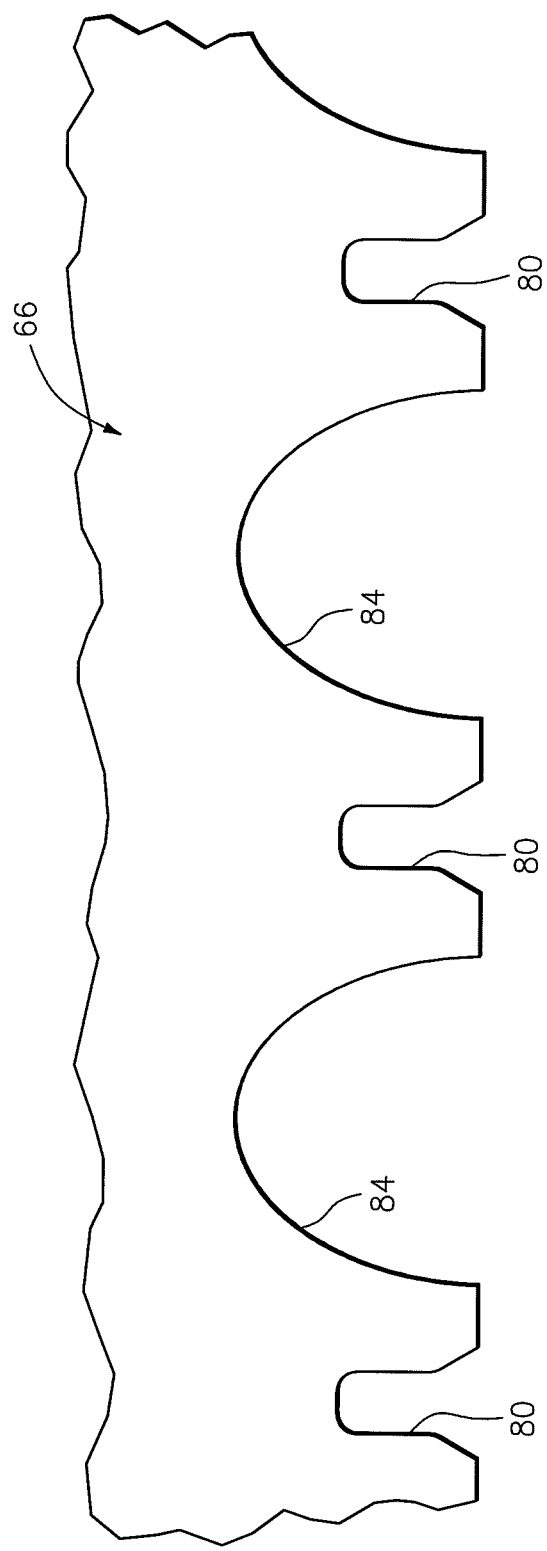
FIG. 3 is a face view of a full hoop component taken along line 3-3 in FIG. 2.

With reference to FIG. 3, a weight reduction feature 84 separates each of the slots 80 of the full hoop component 66. That is, the full hoop component 66 is lightened with the weight reduction feature 84 that, however, may complicate installation as the lugs 82 may inadvertently be assembled therein—especially under blind assembly conditions.

Figure 4:
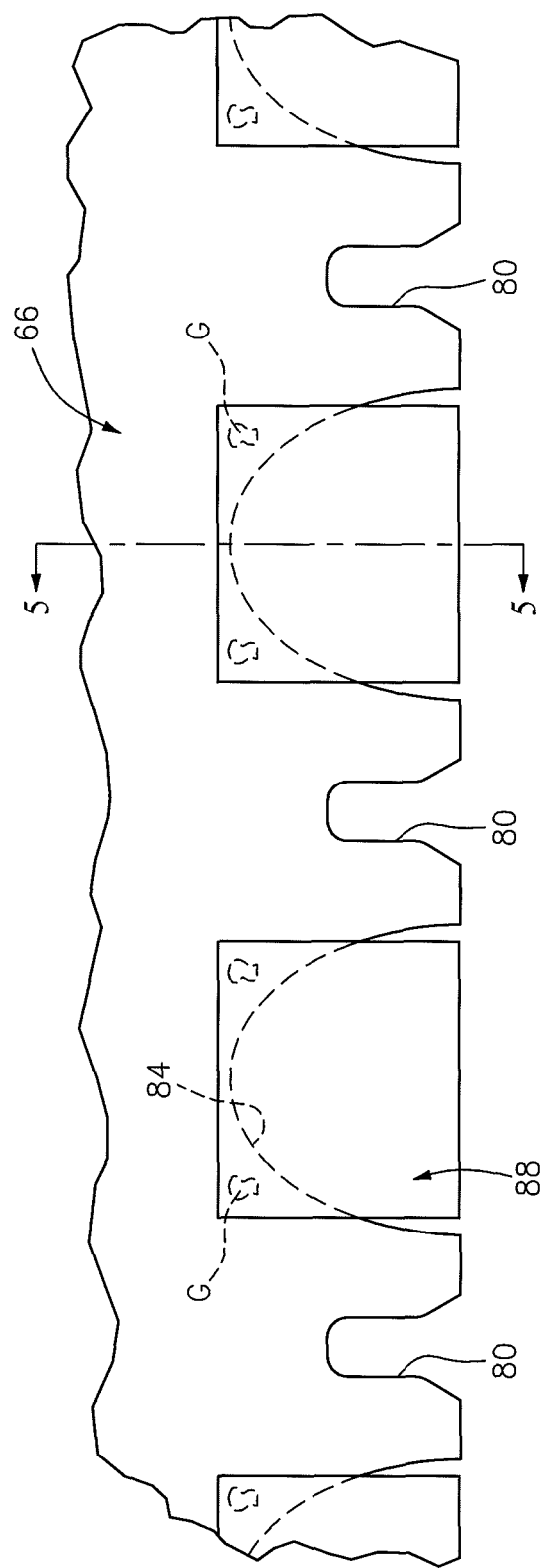
FIG. 4 is a face view of a full hoop component taken along line 3-3 in FIG. 2 with a multiple of consumable assembly tool clips according to one disclosed non-limiting embodiment.
Figure 5:
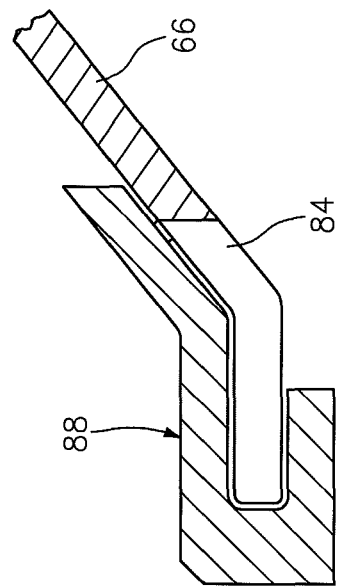
FIG. 5 is a sectional view through one of the multiple of consumable assembly tool clips along line 5-5 in FIG. 4.

With reference to FIG. 4, to avoid inadvertent assembly of the lugs 82 into the weight reduction features 84, a consumable assembly tool clip 88 is clipped over the weight reduction features 84 (also shown in FIG. 5). The consumable assembly tool clip 88 thereby prevents the lugs 82 or other features from improper installation. The consumable assembly tool clip 88 may be particularly useful when assembly is blind and cannot later be inspected.

The consumable assembly tool clip 88 generally includes opposed fingers separated to receive and cover a desired area of the weight reduction features 84. The consumable assembly tool clip 88 may also include a profiled surface that may follow a contour of the full hoop component 66. It should be appreciated that although a particular geometry is illustrated in the disclosed non-limiting embodiment, other shapes may be alternatively or additionally provided.

The consumable assembly tool clip 88 is manufactured of low-density material which vaporizes when the engine 20 is first run. The low-density material may be, in one example, a Polymer such as polyethylene which vaporizes at approximately 600 degrees F. (315 C) which is well within the operational temperatures of the HPT 54. The consumable assembly tool clip 88 will leave no residue or trace evidence after vaporization.

The consumable assembly tool clip 88 may be attached with a cyanoacrylate or wax to facilitate assembly to glue the consumable assembly tool clip 88 at an example glue location G. That is, a material that also vaporizes when the engine 20 is run-in may attach each consumable assembly tool clip 88. Alternatively, the consumable assembly tool clip 88 may be clipped into position with an interference fit.

Figure 6:
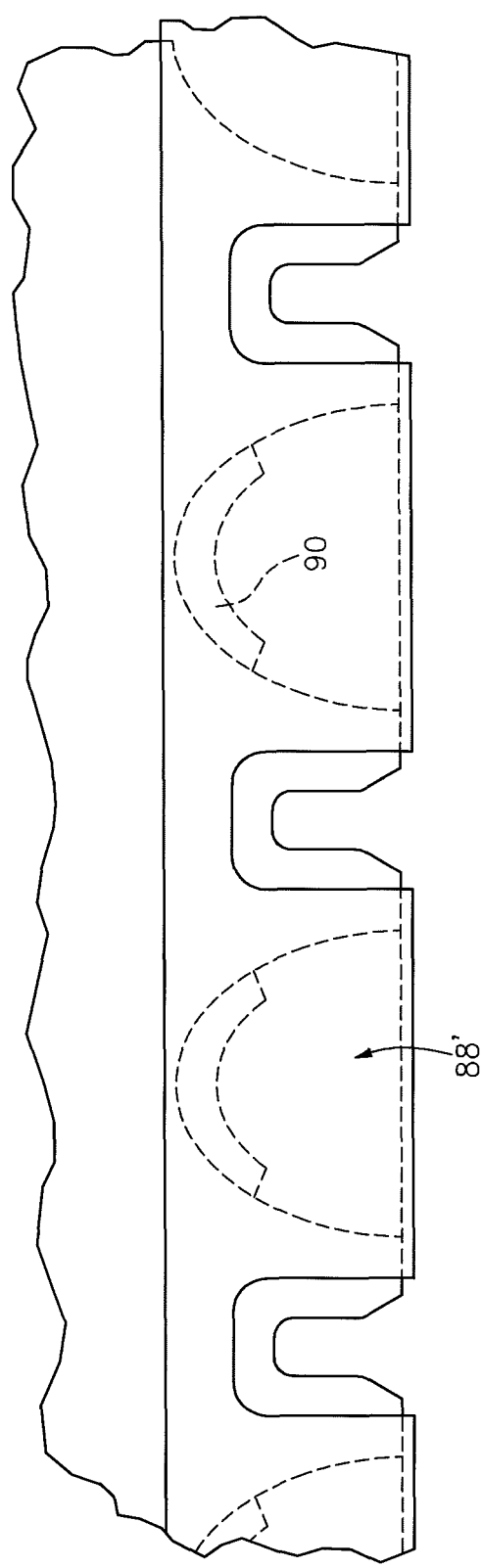
FIG. 6 is a face view of the full hoop component with a full hoop consumable assembly tool clip according to another disclosed non-limiting embodiment.

With reference to FIG. 6, in another disclosed non-limiting embodiment the consumable assembly tool clip 88' may be a full hoop structure with open areas for the slots 80. The full hoop consumable assembly tool clip 88' may also include a locator 90 which, for example is received within the weight reduction feature 84 to circumferentially position the consumable assembly tool clip 88 on the full hoop component 66.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. An assembly for a gas turbine engine comprising:
   a component;
   a consumable assembly tool clip attached to said component;
   a support that includes a first interface that engages with a first segmented hook that extends from an engine case structure;
   the support includes a second interface that engages with a second segmented hook that extends from the engine case structure;
   a blade outer air seal that includes a first flange that interfaces with a first extended portion of the support; and
   the blade outer air seal includes a second flange that interfaces with a second extended portion of the support;
   wherein the blade outer air seal includes a lug, and
   wherein the component includes a slot that receives the lug, and
   wherein the consumable assembly tool clip is manufactured of a material that vaporizes when the engine is run.

2. The assembly as recited in claim 1, wherein said consumable assembly tool clip is manufactured of a Polymer.

3. The assembly as recited in claim 1, wherein said consumable assembly tool clip is manufactured of a polyethylene.

4. The assembly as recited in claim 1, wherein said consumable assembly tool clip is glued to said component.

5. The assembly as recited in claim 1, wherein said consumable assembly tool clip includes a full hoop ring.

6. The assembly as recited in claim 1, wherein said consumable assembly tool clip includes a multiple of segments.

7. The assembly as recited in claim 1, wherein said consumable assembly tool clip is clipped to said component.

8. The assembly as recited in claim 1, wherein said consumable assembly tool clip is clipped to said component with an interference fit.

9. The assembly as recited in claim 1, wherein the component is a full hoop component.

10. The assembly as recited in claim 9, wherein the component includes a plurality of weight reduction features.

11. The assembly as recited in claim 10, wherein the component includes a plurality of slots, and wherein each of the weight reduction features separate each of the slots of the component.

12. The assembly as recited in claim 10, wherein the consumable assembly tool clip is clipped over the weight reduction features.

13. The assembly as recited in claim 10, wherein the consumable assembly tool clip includes opposed fingers separated to receive and cover an area of the weight reduction features.

14. The assembly as recited in claim 10, wherein the consumable assembly tool clip includes a profile surface that follows a contour of the component.

15. The assembly as recited in claim 5, wherein the component includes a weight reduction feature, and wherein the consumable assembly tool clip includes a locator that is received within the weight reduction feature to circumferentially position the consumable assembly tool clip on the component with respect to a central longitudinal axis of the engine.

16. The assembly as recited in claim 1, wherein the material of the consumable assembly tool clip vaporizes when the engine is run a first time after the assembly is installed on the engine.

17. The assembly as recited in claim 1, wherein the lug and slot define a lug slot interface, and wherein when the engine is operated the blade outer air seal applies a load circumferentially into the component at the lug slot interface, and wherein the load is transferred through the component to the engine case structure.

18. The assembly as recited in claim 17, wherein the component rotationally locks to anti-rotate the blade outer air seal and the support.

\* \* \* \* \*